United States Patent [19]
Eisenhaure et al.

[11] Patent Number: 5,929,612
[45] Date of Patent: Jul. 27, 1999

[54] EXTERNALLY FIELD-CONTROLLED INDUCTION GENERATOR

[75] Inventors: David B. Eisenhaure, Cohasset; James L. Kirtley, Jr., Brookline; Geoffrey B. Lansberry, Hingham, all of Mass.; Kevin J. Donegan, Merrimack, N.H.; Gita P. Rao, Belmont, Mass.

[73] Assignee: Satcon Technology Corporation, Cambridge, Mass.

[21] Appl. No.: 08/888,347

[22] Filed: Jul. 3, 1997

Related U.S. Application Data

[63] Continuation-in-part of application No. 08/472,493, Jun. 7, 1995, abandoned.

[51] Int. Cl.[6] .................................................. H02P 9/00
[52] U.S. Cl. .............................. 322/47; 310/160; 290/8
[58] Field of Search .............................. 322/18, 20, 25, 322/27, 45, 47; 310/160; 290/8, 40 C

[56] References Cited

U.S. PATENT DOCUMENTS

| | | | |
|---|---|---|---|
| 2,897,738 | 1/1959 | Schwan | 310/160 |
| 3,675,117 | 7/1972 | Reimers | 322/31 |
| 3,832,625 | 8/1974 | Gyugyi | 322/47 |
| 3,982,170 | 9/1976 | Gritter et al. | 322/47 |
| 4,006,399 | 2/1977 | Studtmann | 322/47 |
| 4,228,391 | 10/1980 | Owen et al. | 322/35 |
| 4,242,628 | 12/1980 | Mohan et al. | 322/35 |
| 4,472,673 | 9/1984 | Miller | 322/32 |
| 4,994,684 | 2/1991 | Lauw et al. | 290/52 |
| 5,028,804 | 7/1991 | Lauw | 290/40 C |
| 5,434,496 | 7/1995 | Roberts | 323/208 |
| 5,751,069 | 5/1998 | Rajashekara et al. | 290/40 C |
| 5,777,459 | 7/1998 | Bansal et al. | 322/47 |
| 5,798,631 | 8/1998 | Spee et al. | 322/25 |
| 5,798,632 | 8/1998 | Muljadi | 322/29 |

OTHER PUBLICATIONS

Powerex, Inc., *Power Transistor Module Reference Guide*, 4th Ed., May 1993, pp. 22–23, 66, 200 Hillis St., Youngwood, PA 15697–1800, and 1$^{st}$ Ed. Apr. 1994, pp. T–45 & T–49.

B.K. Bose et al., *Power Electronics & Variable Frequency Drive*, Chap. 4, pp. 138–208, & Chap. 5, pp. 222–239, IEEE Press, Piscataway, NJ, 1996.

*Primary Examiner*—Nestor Ramirez
*Assistant Examiner*—Nicholas Ponomarenko
*Attorney, Agent, or Firm*—David G. Conlin; William J. Daley, Jr.

[57] ABSTRACT

In an induction generator, an additional set of stator windings is provided, separate from and secondary to the main stator windings upon which the generator's output voltage is generated and supplied to the load. This separate stator winding is provided for the purpose of supplying the generator with the reactive electrical power it needs to maintain the rotating stator field and supplying any reactive power needed by the load. Thus, there is no need to use a capacitor assembly, for supplying the reactive power needed by the generator. Currents are injected into this separate winding in such a way that only reactive power is supplied to the generator. Specifically, a power measuring circuit measures the power in the additional set of stator windings, and a power error signal is formed by algebraically adding the outputs of the power measuring circuit. The power error signal is further processed and supplied as a timing control signal for generating the injected currents, which are maintained 90 degrees out of phase with an excitation voltage curve.

9 Claims, 15 Drawing Sheets

EXTERNALLY FIELD-CONTROLLED INDUCTION GENERATOR

This application is a continuation-in-part of application U.S. Ser. No. 08/472,493, filed Jun. 7, 1995, now abandoned.

STATEMENT REGARDING FEDERALLY-SPONSORED RESEARCH

This invention was made with Government support under contract No. DAAB12-95-C-0014 awarded by the Department of the Army. The Government has certain rights in the invention.

Cross-reference to related literature, the disclosures of which are hereby incorporated by reference: "Power Electronics and Variable Frequency Drive," by B. K. Bose, Chapter 4 (pp. 138–208) & Chapter 5 (esp. pp. 222–239), ISBN 0-471-58408-8 (IEEE Press, Piscataway, N.J., 1996); POWEREX datasheet on model PM20CSJ060, contained in Power Transistor Module Reference Guide, pp. T-45 & T-49 (1st Ed., April 1994, Powerex Literature, 930 Penn Ave., Pittsburgh Pa. 15222).

FIELD OF THE INVENTION

The present invention relates to electric generators, and particularly to a high-speed induction generator for generating electrical power from a rapidly turning source such as a gas turbine. Speeds exceeding 60,000 revolutions per minute (RPM) are contemplated. Tip speeds exceeding 200 meters/second, unknown in synchronous generators, have been achieved.

BACKGROUND

Induction generators have certain advantages over synchronous generators. Synchronous generators require separate field windings on the rotor which are excited by a separate DC voltage source, thus making the rotor complicated, asymmetrical and difficult to operate at high speeds. Induction generators do not have field windings, and thus have a more symmetrical structure. Therefore, induction generators are cheaper and more rugged than synchronous generators. Also, induction generators can be operated at higher speeds, due to their symmetrical nature and simple structure.

Such high speed machines permit a small size with a relatively large power output, making them especially desirable for use in vehicles, such as automobiles, trains and planes.

The current in the rotor windings of an induction generator is induced by the rotating stator magnetic field. This rotating stator magnetic field must be maintained by applying reactive electric power to the generator.

In the prior art, this reactive electric power was supplied by adding capacitors to the stator winding terminals in parallel with the load. A tank circuit was thus formed by the added capacitors and the inherent inductance of the induction generator. This tank circuit resonates at a certain frequency, after a small charge is placed on the capacitors.

In this conventional induction generator, a negative resistor is referred across the air gap, and is effectively placed in parallel with a capacitor and an inductor. This negative resistor "pumps" or effectively pushes electrical power into the tank circuit, and thus the capacitance supplies reactive power to the induction generator.

Such an arrangement suffers from undesirable drawbacks. For example, the capacitor and inductor assembly has only one resonant frequency, and thus the induction generator will only operate at one speed. The speed could be changed by using an adjustable capacitor, but this is very difficult and expensive, due to the physical nature and cost of such adjustable capacitors.

Another drawback is that there is effectively no limit on the amount of power that is supplied to the tank circuit by the negative resistor, except for inductor saturation. This can lead to uncontrolled, excessive variation of voltage with load.

Further, when the load is changed, the resonant frequency and the voltage also change, since these quantities are load-dependent. In other words, the parameters load, resonant frequency and voltage are interdependent or "coupled." This makes the prior art induction generator very difficult to control, and this control problem is a major reason why induction generators are not widely used.

SUMMARY OF THE INVENTION

An object of the present invention is to provide an induction generator free of the above drawbacks, so as to produce an induction generator which is practical to use.

A more specific object of the present invention is to provide an induction generator which can be operated easily over a wide range of speeds, with a high level of stability and with the ability to easily control such electrical quantities as terminal voltage and frequency.

The present objects are achieved, according to the present invention, by providing, in an induction generator, an additional set of stator windings, separate from and secondary to the main stator windings upon which the generator's output voltage is generated and supplied to the load. This separate stator winding is provided for the purpose of supplying the generator with the reactive electrical power it needs to maintain the rotating stator field, which induces current in the rotor windings, and supplying any reactive power required by the load (if the load is not at power factor=1). Thus, there is no need to use a capacitor assembly, for supplying reactive power to the induction generator.

Sinusoidal currents are injected into this separate winding in such a way that only reactive power is supplied to the generator. For each phase of the secondary winding, the products of the voltage for the phase and the current are inverted and summed together, to create a power error signal for use in setting the phase of the three injected currents, so that the currents contribute no real power, aside from losses in the exciting winding itself. In this way, only reactive power, and no real power, is transferred to the induction generator. Note that "real" or "time average" power in an electric circuit is equal to the time average of the product of voltage and current. Concretely, this avoidance of injecting real power is accomplished by the use of a feedback circuit in which real power into the excitation winding is measured and, by controlling the phase (timing) of current injected into that winding, forcing the value of that real power to be zero. The control circuit continuously monitors whether reactive or real power is being applied by each phase winding to the generator.

BRIEF FIGURE DESCRIPTION

DETAILED DESCRIPTION OF THE PREFERRED EMBODIMENTS

Figure 1:
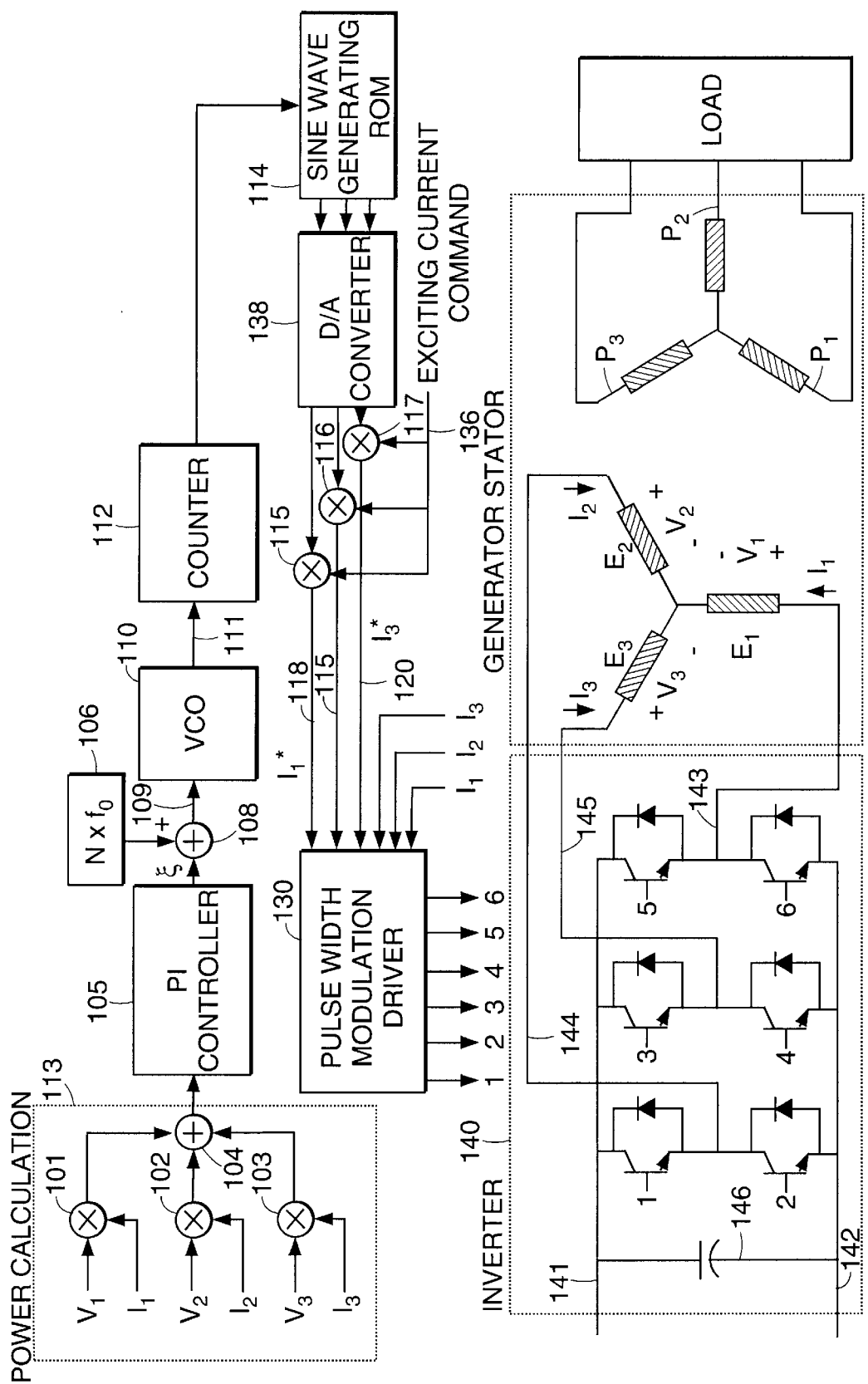
FIG. 1 illustrates a first embodiment employing a sine-wave-generating Read Only Memory (ROM) and a Pulse Width Modulation (PWM) driver.

Structure of the FIG. 1 Embodiment

Figure 10:
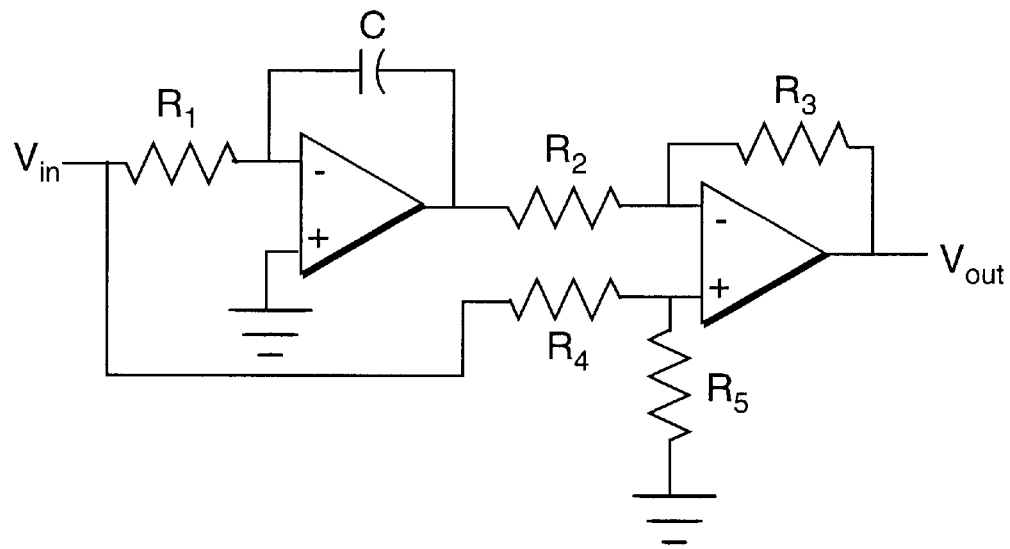
FIG. 10 is a schematic diagram of a suitable PI controller module usable in the embodiments of FIGS. 1–4 or 13.

As shown in FIG. 1, the induction generator of a preferred embodiment of the present invention has three phases P1, P2 and P3 of power windings, connected to a load. In the same stator are respective excitation windings E1, E2 and E3, each of which is so located as to excite one phase of the power windings. Voltage and current are measured in each of windings E1, E2 and E3 by a power calculation circuit 113. In circuit 113, a first multiplier 101 derives a power value for winding E1, a second multiplier 102 derives a power value for winding E2, and a third multiplier 103 derives a power value for winding E3. These three power values are added by a first adder 104 and the result is fed to a Proportional+Integral ("PI") controller 105. Controller 105 can be constructed from a pair of operational amplifiers, e.g. model LM741 manufactured by Texas Instruments, or can be implemented by appropriate programming of a microprocessor or Digital Signal Processor (DSP). The output of PI controller circuit 105 is the so-called "power error" signal, ξ. The transfer function of an analog PI controller would be:

$$\frac{V_{OUT}}{V_{IN}} = \frac{R_3}{R_2}\left(\frac{1}{R_1 C} + \frac{R_5}{R_5 + R_4}\right)$$

where, as shown in FIG. 10, $V_{IN}$ is the voltage in, $V_{OUT}$ is the voltage out, $R_1$ is the value of the input resistor, $R_2$ is the value of the second resistor (at the output of the first operational amplifier or op-amp), $R_3$ is the value of the third resistor connecting the output of the second op-amp (shown at right) back to the negative input thereof, $R_4$ is the value of the fourth resistor connected between $V_{IN}$ and the positive input of the second op-amp, $R_5$ is the value of the fifth, grounding resistor, and C is the value of the capacitor connected in parallel to the first op-amp. $V_{OUT}$ is the power error signal.

In a preferred embodiment shown in FIG. 1, signal 106, which is an integer N times a desired operating frequency $f_0$ of the driving circuit, is combined with the power error signal in a second adder 108, whose output signal 109 is applied to a Voltage Controlled Oscillator (VCO) 110. The output signal 111 of the VCO is applied to a counter 112. The output signal of counter 112 is applied to sine wave generating circuit 114, which is suitably a Programmable Read Only Memory (PROM) containing a table of values which are set forth below. These values are generated by deciding how many numbers are to make up the sine wave representation, dividing $2\pi$ by that integer, making up a list of arguments, and taking the sine of each argument. That number is scaled by a constant to make it fit into the integer format of the PROM, and the scaled sequence of numbers is programmed or "burned" into the PROM by using a suitable voltage.

A suitable way to write the numbers is in hexadecimal radix and two's complement representation. Hexadecimal radix is commonly known as "base 16" and uses the symbols A–F to represent 10–15, i.e. A=10, B=11, C=12, D=13, E=14 and F=15. This means each hexadecimal single-place number can be easily translated into a 4-place binary number for further processing, e.g. in the ALU (Arithmetic & Logic Unit) of a microprocessor. Two's complement is a way of representing negative numbers. To get a two's complement number, one takes the corresponding positive number, complements each bit, and then adds one. With 8 bits (binary places), one can represent integers from –127 to +127 (+127 in hexadecimal is 7F, while –127 in hexadecimal is 81). A 128-step, 8-bit wide representation of a sine wave is:

| | | | | | | | |
|---|---|---|---|---|---|---|---|
| 00 | 06 | 0C | 13 | 19 | 1F | 25 | 2B |
| 31 | 36 | 3C | 41 | 47 | 4C | 51 | 55 |
| 5A | 5E | 62 | 66 | 6A | 6D | 70 | 73 |
| 75 | 78 | 7A | 7B | 7D | 7E | 7E | 7F |
| 7F | 7F | 7E | 7E | 7D | 7B | 7A | 78 |
| 75 | 73 | 70 | 6D | 6A | 66 | 62 | 5E |
| 5A | 55 | 51 | 4C | 47 | 41 | 3C | 36 |
| 31 | 2B | 25 | 1F | 19 | 13 | 0C | 06 |
| 00 | FA | F4 | ED | E7 | E1 | DB | D5 |
| CF | CA | C4 | BF | B9 | B4 | AF | AB |
| A6 | A2 | 9E | 9A | 96 | 93 | 90 | 8D |
| 8B | 88 | 86 | 85 | 83 | 82 | 82 | 81 |
| 81 | 81 | 82 | 82 | 83 | 85 | 86 | 88 |
| 8B | 8D | 90 | 93 | 96 | 9A | 9E | A2 |
| A6 | AB | AF | B4 | B9 | BF | C4 | CA |
| CF | D5 | DB | E1 | E7 | ED | F4 | FA |

The same set of number in "Intel Hex Format," which is understood by most machines used in the trade to program a PROM chip, is (with blank spaces inserted for readability purposes only):

| | | | | | | | | | |
|---|---|---|---|---|---|---|---|---|---|
| :0800 | 0000 | 00 06 | 0C 13 | 19 1F | 25 2B | 4B |
| :0800 | 0800 | 31 36 | 3C 41 | 47 4C | 51 55 | D3 |
| :0800 | 1000 | 5A 5E | 62 66 | 6A 6D | 70 73 | AE |
| :0800 | 1800 | 75 73 | 70 6D | 6A 66 | 62 5E | 06 |
| :0800 | 2000 | 7F 7F | 7E 7E | 7D 7B | 7A 78 | F4 |
| :0800 | 2800 | 75 73 | 70 6D | 6A 66 | 62 5E | 7B |
| :0800 | 3000 | 5A 55 | 51 4C | 47 41 | 3C 36 | 82 |

-continued

```
:0800 3800  31 2B  25 1F  19 13  0C 06  E2
:0800 4000  00 FA  F4 ED  E7 E1  DB D5  65
:0800 4800  CF CA  C4 BF  B9 B4  AF AB  CD
:0800 5000  A6 A2  9E 9A  96 93  90 8D  E2
:0800 5800  8B 88  86 85  83 82  82 81  7A
:0800 6000  81 81  82 82  83 85  86 88  7C
:0800 6800  8B 8D  90 93  96 9A  9E A2  E5
:0800 7000  A6 AB  AF B4  B9 BF  C4 CA  CE
:0800 7800  CF D5  DB E1  E7 ED  F4 FA  FE
:0000 0001  FF
```

The reader will note that, compared to the first hexadecimal table set forth above, a colon and an 8-place character string has been added at the beginning of each line and a 2-place character string has been added at the end of each line. The final line is an "end of file" indicator.

PROM 114 generates three output signals, which are fed through a standard digital-to-analog ("D/A") converter 138 and then respectively to first, second and third current multipliers 115, 116, 117. An exciting current command is generated external to the generator, e.g. by a voltage regulator, and applied via line 136 to a second input of each current multiplier. The output signals 118, 119, 120 of the current multipliers are applied to three inputs of a Pulse Width Modulation (PWM) driver 130, of the kind described in Chapter 4 of the Bose text cited at the beginning of this specification. Three further inputs of the PWM driver receive signals $I_1$, $I_2$, and $I_3$, representing the currents measured in the three excitation windings. PWM driver 130 generates control signals 1–6 which are applied to the bases of respective semiconductor switches in an inverter module 140, as shown in the figure. Inverter module 140 has two input power terminals 141, 142 connected to a source of DC power, e.g. from a rectifier connected to an output of the power winding, and to three output terminals 143, 144, and 145 which are connected respectively to one end of an excitation winding E1, E2, E3 in the stator. The Bose text illustrates a similar inverter in its FIGS. 4–5. Across the input terminals 141, 142, there is provided a capacitor 146, whose function is to smooth the voltage. A respective "snubbing diode" is connected in parallel to the emitter-collector path of each of semiconductor switches 1–6.

Operation of the FIG. 1 Embodiment

An induction motor typically has only a single set of windings. Prior art induction generators have also typically had only one set of windings, and this simplicity of structure was thought to be one of their advantages. However, we have discovered that designing an induction generator with two sets of windings, namely separate excitation windings and power windings, on the same core, makes it possible to achieve a decoupling of excitation current magnitude from excitation phase. By proper timing of the excitation current pulses, one can avoid injecting any "real" power into the excitation winding. Instead, one injects only "reactive" power along the d-axis of the interaction. This makes controlling the electrical system much simpler, because the values of different parameters are no longer interdependent. An essentially linear feedback control loop can then be used, cf. FIG. 15.

Figure 16:
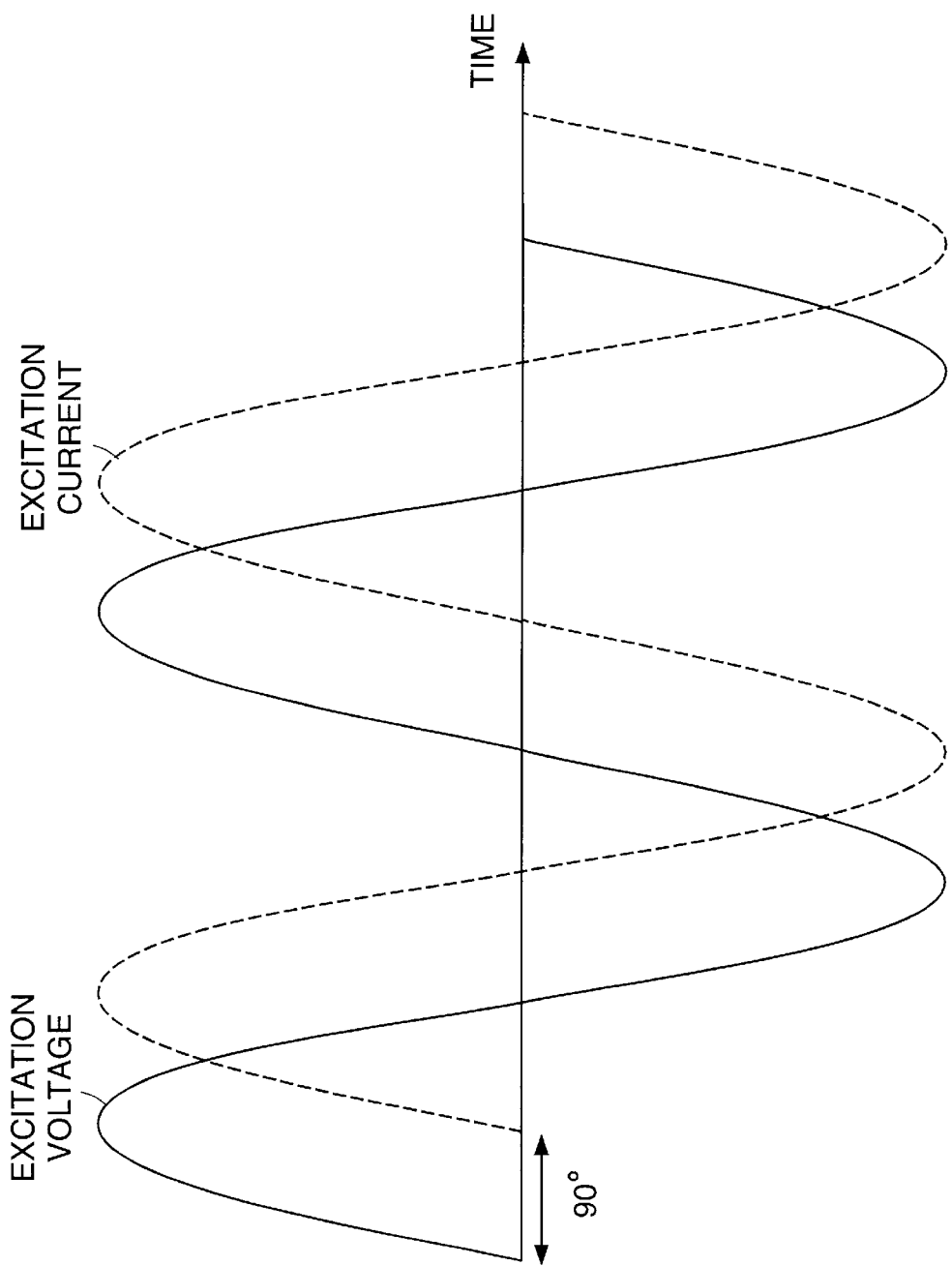
FIG. 16 is a waveform diagram showing excitation voltage and excitation current 90 degrees out of phase with each other.

With reference to FIG. 16, note that real, or time average power in an electric circuit is equal to the time average of the product of voltage and current. If the voltage and current are both sinusoidal, the real power is one half the product of their peak amplitudes, times the cosine of the angle between them. So, if voltage and current are as represented in FIG. 16, in which the voltage leads current by ninety degrees, the cosine of the 90 degree angle is zero, and thus the real power is zero. Further, if the current were to be advanced by a small amount, real power would become positive, while if it were retarded a little bit, real power would become negative.

In the induction generator, the amplitude of excitation current should be controlled to produce the desired terminal voltage. Thus the way of controlling excitation power to zero is to control the phase angle of excitation current with respect to excitation voltage. This accomplished, according to this invention, by controlling the phase of the excitation using a PI controller driving a voltage controlled oscillator which will serve to advance current phase, if real power in the excitation current is negative, or retard it, if real power is positive. The phase, or angular spacing, of the current wave, with respect to the voltage wave, is adjusted to keep the cosine of the angle between them zero. The PI controller in the phase control loop will drive real power to zero.

Separating the excitation function (in one stator winding) from the power extraction function (in the other stator winding) has the additional advantage that excitation can take place at a substantially different voltage level from power extraction. For example, in an embodiment much larger than the preferred embodiment described herein, one can use an excitation voltage around 1,000 volts, but obtain terminal voltage from the power windings of 4,000 volts or even 13,800 volts. The advantage of this is single-stage devices (thyristors or transistors) which operate at 1,000 volts are commercially available, but at 4,000 volts or higher, devices must be cascaded to make a multi-stage circuit, with added complexity and vulnerability to device failure.

Figure 2:
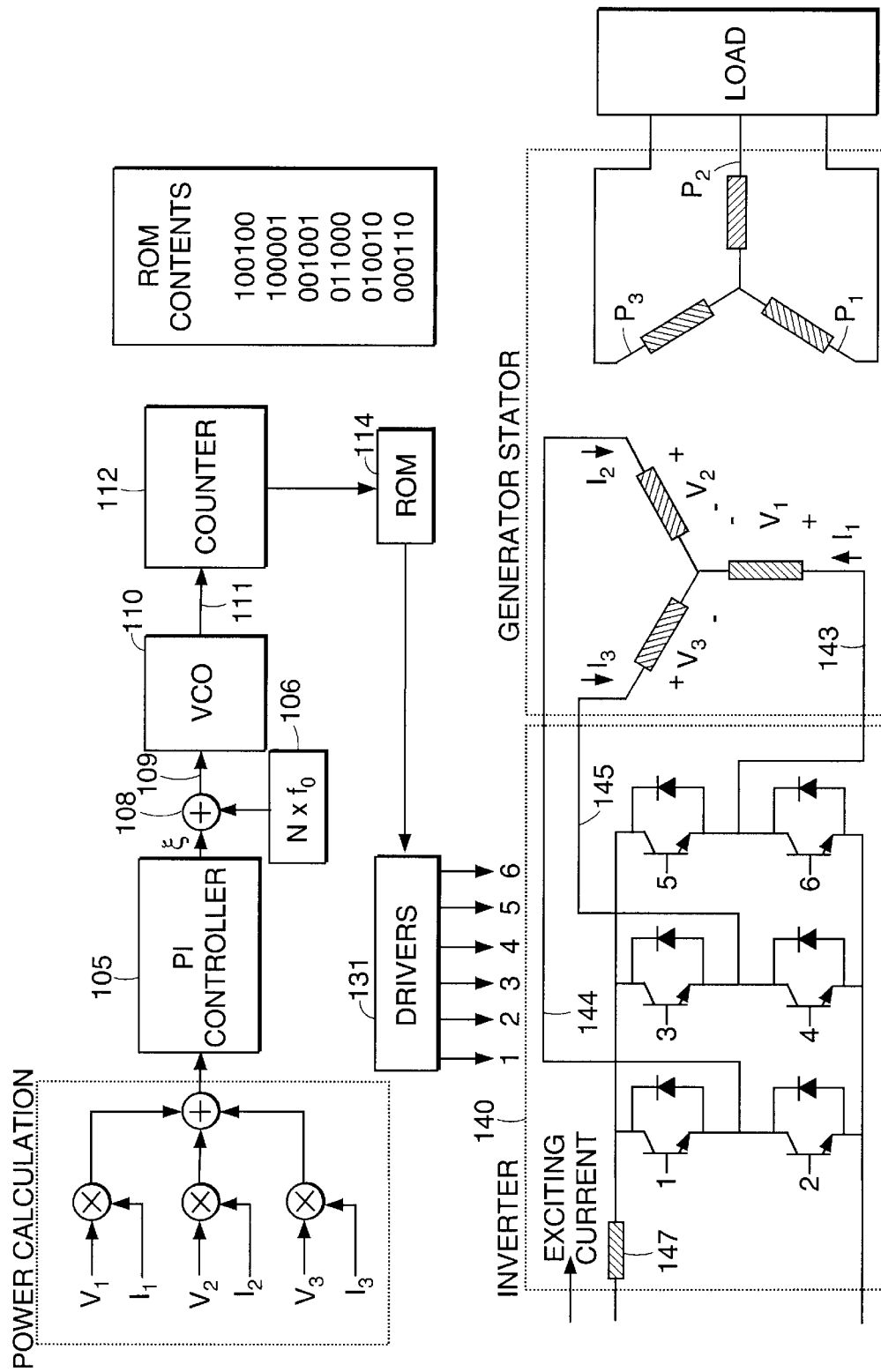
FIG. 2 illustrates a second embodiment employing rectangular current pulses and an inverter switching stage using transistors.

Structure of the FIG. 2 Embodiment

FIG. 2 illustrates an alternate embodiment, in which many components correspond to components of the FIG. 1 embodiment. Corresponding components have been given the same reference numerals and need not be described again. In this embodiment, the currents ted to the excitation windings have the form of continuous and relatively long pulses. This has simpler controls because the current pulses are not sine waves, but rather square wave patterns in which semiconductor switches 1–6 are turned ON or OFF according to the contents of 6-bit binary "words" stored in the ROM, with "0" representing "OFF" and "1" representing "ON" or vice versa. For example, "100100" would turn ON switches 1 and 4 and turn OFF switches 2, 3, 5, and 6. In this embodiment, each switch is a transistor.

In this second embodiment, instead of a voltage source inverter, a current source inverter is used, so filter capacitor 146 is omitted, and replaced by a coil or filter choke 147 in line 141 of inverter 140. Its function is to maintain more nearly constant current, applied to the machine, making the system more like a synchronous machine. This circuit would dissipate more waste heat than the embodiment of FIG. 1, for comparable power values, but could be economically be scaled up to higher voltage values. The "square wave" pulses have higher harmonic content than the sine wave pulses used in the FIG. 1 embodiment.

Figure 3:
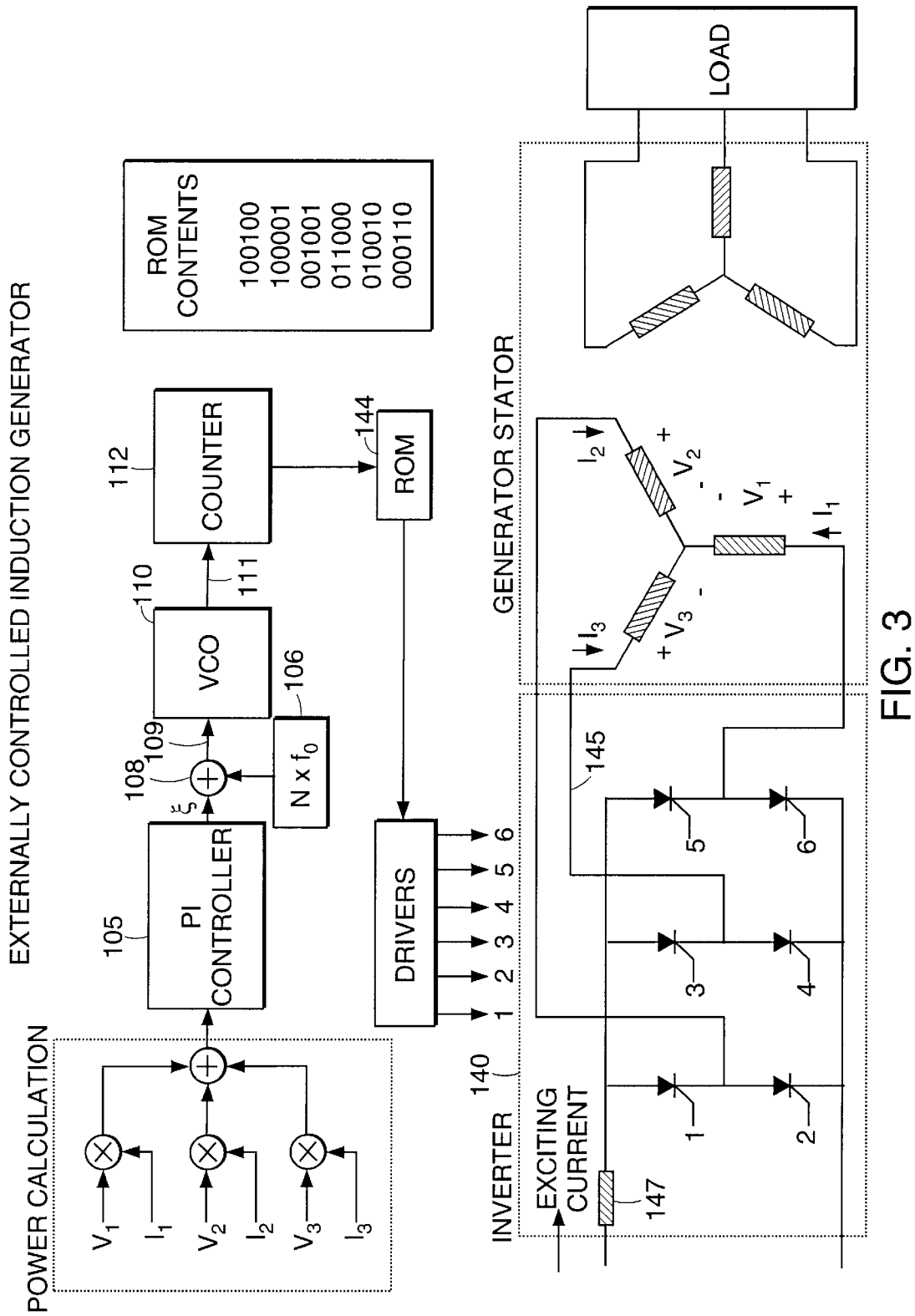
FIG. 3 illustrates a third embodiment employing rectangular current pulses and an inverter switching stage using thyristors.

Structure of the FIG. 3 Embodiment

FIG. 3 illustrates a third embodiment similar to the second embodiment, except that the transistor/diode pairs of FIG. 2 have each been replaced by a thyristor. The advantage of this structure is that thyristors (ordinary silicon-controlled rectifiers, gate turn-off thyristors, and MOS-controlled thyristors) can be obtained in larger voltage and current ratings than transistors can.

Operation of the FIG. 3 Embodiment

The FIG. 3 embodiment operates essentially the same as the FIG. 2 embodiment described above.

Figure 4:
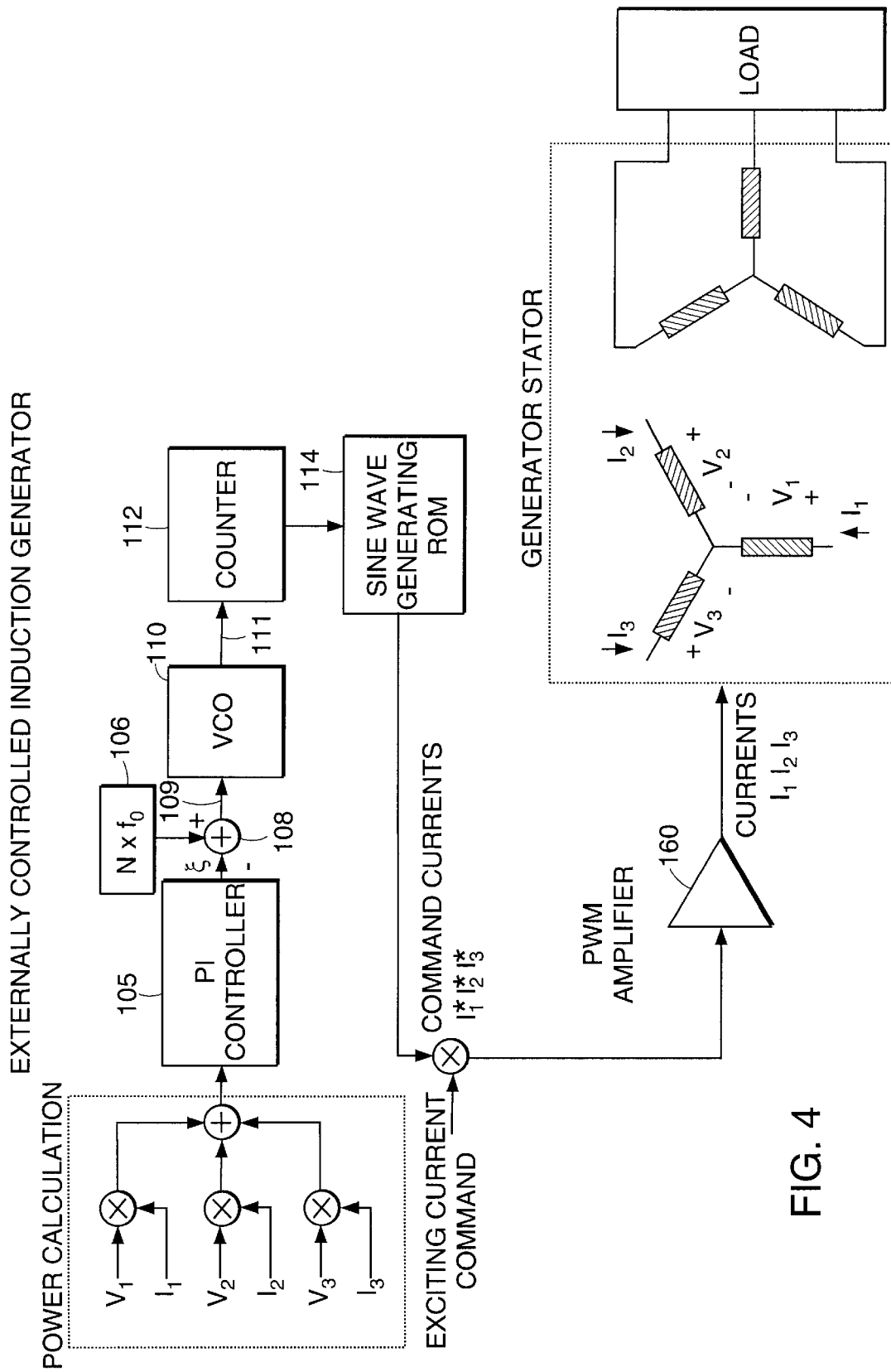
FIG. 4 illustrates a fourth embodiment employing sine wave current pulses and a Pulse Width Modulation (PWM) amplifier.

Structure of the FIG. 4 Embodiment

FIG. 4 illustrates a fourth embodiment, in which components 101–114 are essentially the same as those of FIG. 1, only drawn more schematically. However, inverter module 140 has been replaced by a Pulse Width Modulation (PWM) amplifier 150 which generates the signals for switching of the excitation currents on and off. A power stage (not shown), consisting of three half-bridges, receives control signals from PWM amplifier 150 and turns the respective excitation phases on and off.

Operation of the FIG. 4 Embodiment

This fourth embodiment operates with a Pulse Width Modulation (PWM) amplifier, which performs essentially the same function as the source inverter and drivers of FIGS. 1–3.

According to conventional induction generator theory, a rotor is rotated by a prime mover at a speed higher than the synchronous speed. The main stator three-phase winding is connected to the load for supplying electrical power thereto.

Instead of connecting capacitors in parallel to the load, as was conventionally done, the present invention provides a separate stator three-phase winding assembly, for the purpose of exciting the generator and maintaining its rotating stator magnetic field. Three-phase currents $i_1$, $i_2$ and $i_3$ are injected into the excitation windings in such a way that only reactive power, and no real power, is supplied to the generator by such injected currents. The currents to be injected are derived as follows:

For each excitation phase, the voltages v1, v2 and v3 existing across the 3-phase windings are multiplied by the respective currents $i_1$, $i_2$ and $i_3$ flowing through each winding, using multipliers 101, 102 and 103 of FIG. 1. The outputs of the multipliers are supplied to adder circuit 104. Elements 101–104 make up a power measuring or calculation circuit 113. The output of adder 104 is then supplied to a proportional integral (PI) controller circuit 105, a suitable structure for which is shown in FIG. 10. The output of PI controller circuit 105 is the power error signal, $\xi$.

The power error signal $\xi$ is input to a voltage-controlled oscillator (VCO) circuit 110, which also receives a control input of $(N \times f_0)$ where N is an integer of, for example, $2^{10}$, while $f_0$ is the intended frequency (e.g. 60 Hz) of operation. The VCO circuit 110 is constructed so that with $\xi=0$ it will oscillate at frequency $(N \times f_0)$.

The VCO output is sent to digital counter 112 which outputs a count value as an address to read-only memory (ROM) 114, which stores, for example, six-bit data words representing which two of six semiconductor switches of the inverter circuit are to be turned on at a particular time. The output data word is supplied to drivers 130 for appropriately driving the semiconductor switches.

During normal operation, the action of the PI controller 105 will set the frequency of the VCO 110 so as to drive the power error signal to zero. In turn, this drives the real power in the exciting winding to zero, thus correctly setting the phase angle of the exciting currents. For start-up and initial voltage build-up, the VCO will oscillate at the nominal frequency.

Figure 2B:
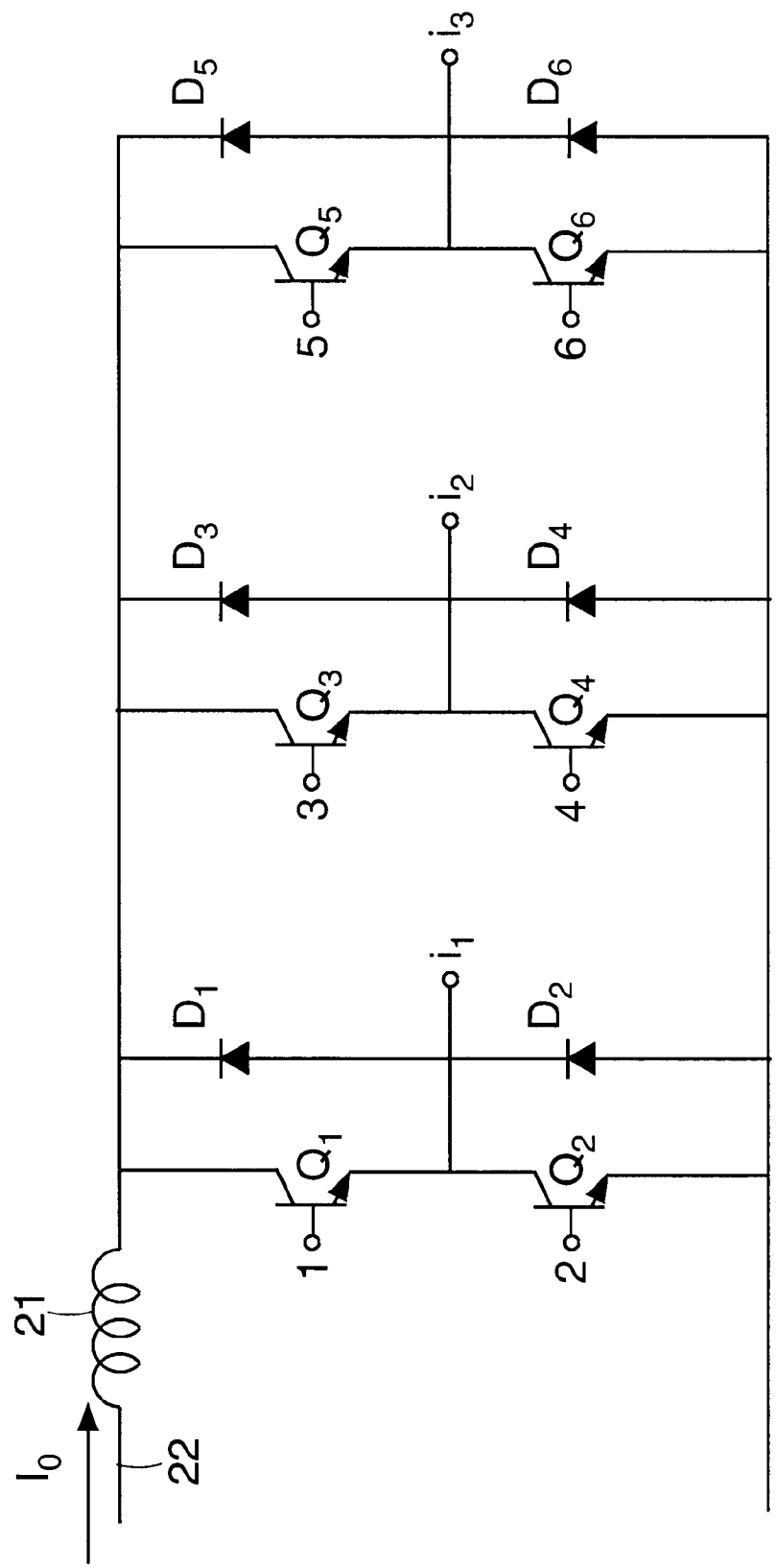
FIG. 2B is a schematic diagram of a current source inverter circuit for generating the injected currents supplied to FIG. 1.

FIG. 2B shows schematically a well-known (off the shelf) current source inverter circuit, such as model no. PM20CSJ060 manufactured by Powerex, Inc. of Youngwood, Pa. (a joint venture of Westinghouse, General Electric and Mitsubishi Electric) The outputs $i_1$, $i_2$ and $i_3$ of this circuit are the injected currents which are supplied to excitation windings E. The inverter circuit includes, for example, six transistors $Q_1$–$Q_6$, six diodes D1–D6 and large choke inductor 21. A current $I_o$ from a controlled current source is supplied as an input on line 22 for setting the magnitude of the injected currents $i_1$–$i_3$. The terminal voltage supplied to the load can be controlled by adjusting the magnitude of the controlled current source.

The bases of the transistors $Q_1$–$Q_6$ are supplied with control signals from driver 130 in order to turn on exactly two of the six transistors at any given time. Each time the counter 112 supplies ROM 114 with a different address signal, ROM 114 outputs a different six-bit data word to driver 130, with each six-bit data word instructing driver 130 to turn on exactly two of the six transistors. Each six bit data word contains 2 bits having a "1" value and four bits having a "0" value. Based on the bit position of the "1" bits, the corresponding transistors are turned on. For example, if the first and fourth bits of a word are "1"'s, then transistors $Q_1$ and $Q_4$ are turned on during the time in which that word is output from ROM 114. When a different word is output from ROM 114, a different set of two transistors will be turned on, depending on the bit content of the word.

Figure 14:
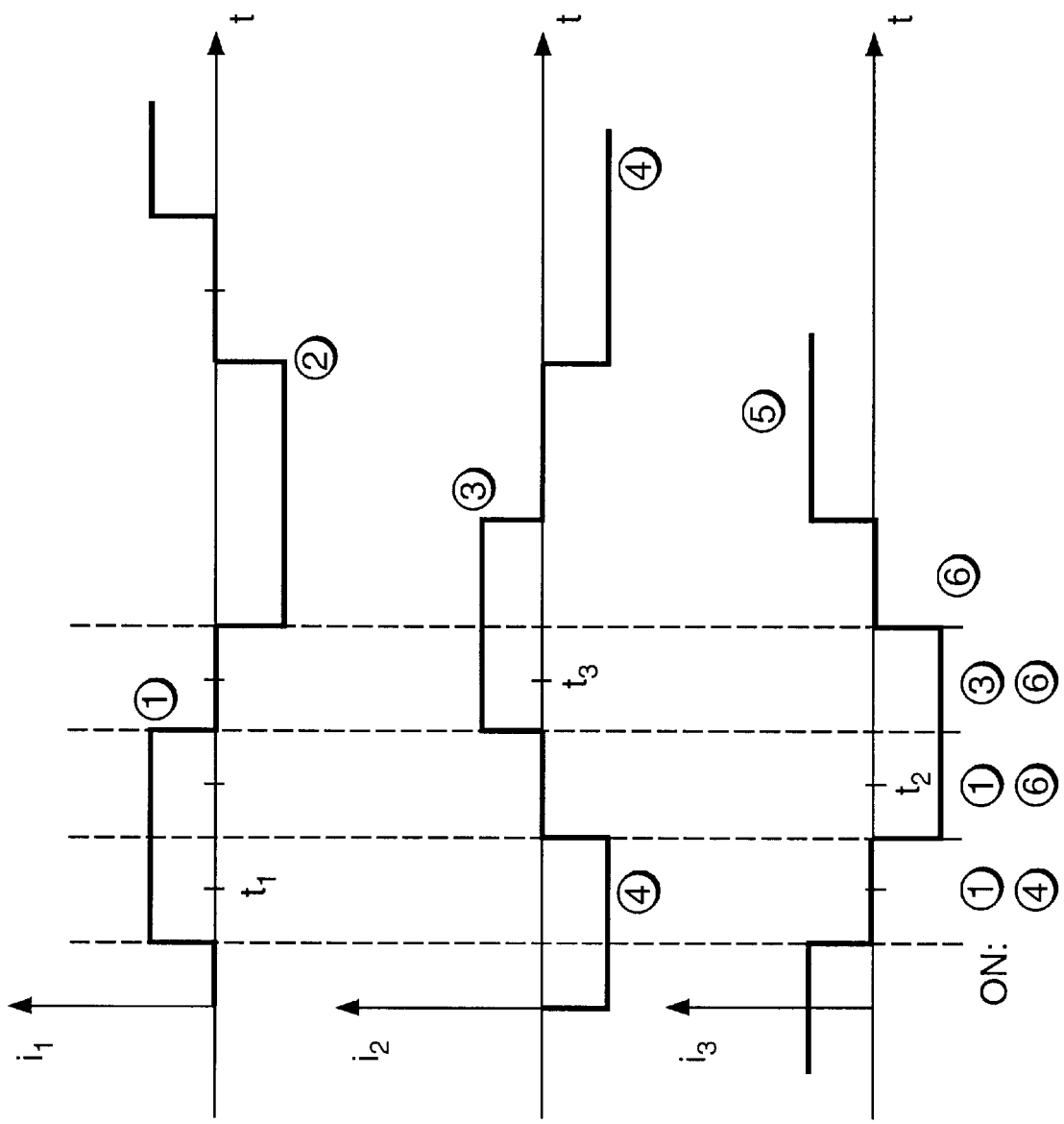
FIGS. 14a–14c show timing diagrams for the circuits of FIGS. 2 and 10 of the preferred embodiment of the invention.

FIGS. 14a–14c are timing diagrams, drawn on a common time scale, of the timing relationship between, respectively, currents $i_1$–$i_3$. At a time $t_1$, a 6-bit word is output from ROM 114, to turn on transistors $Q_1$ and $Q_4$. At a later time $t_2$, a 6-bit word is output from ROM 114 to turn on transistors $Q_1$ and $Q_6$. At a still later time $t_3$, a 6-bit digital word is output from ROM 114 to turn on transistors $Q_3$ and $Q_6$. The reminder of the activation states of the transistors $Q_1$–$Q_6$ can be easily deduced from FIGS. 14a–14c.

The phases of the currents $i_1$–$i_3$ in the excitation windings of FIGS. 1–4 are controlled by the above-described circuitry so that the currents contribute no real power aside from losses in the windings themselves. The currents have time fundamental currents of the mathematical form:

$$i_1 = I_o \cos(\omega_o t + \xi)$$

$$i_2 = I_o \cos\left(\omega_o t + \xi - \frac{2\pi}{3}\right)$$

$$i_3 = I_o \cos\left(\omega_o t + \xi + \frac{2\pi}{3}\right)$$

where $\omega_0$ is the frequency of the alternating current.

The angle $\xi$, the power error, is chosen so that real power transferred by currents $i_1$–$i_3$ is zero.

It is not necessary that the main and secondary stator windings have the same number of turns, nor even the same number of phases, but they must have the same number of poles.

A practical example of the invention will now be given, along with theoretical derivations.

As an example, a 250 kW, 30 kRPM generator has been designed and its excitation requirements analyzed. The following parameters are exemplary:

| | |
|---|---|
| Rotor Diameter | 4.5" |
| Rotor Active Length | 6" |
| Weight of active parts | 49 kg (108 lbs) |
| Efficiency | 97.9% |
| Excitation Required | 56.4 kVAR (22.5%) |

To start, we assume that we will be placing the two stator windings in the same slots with the same winding patterns. This minimizes the leakage inductance between the two windings. The impact of this assumption is not likely to be very large, and we expect that a machine with a different pattern (perhaps even with a different number of excitation phases) will work in essentially the same way.

Figure 5:
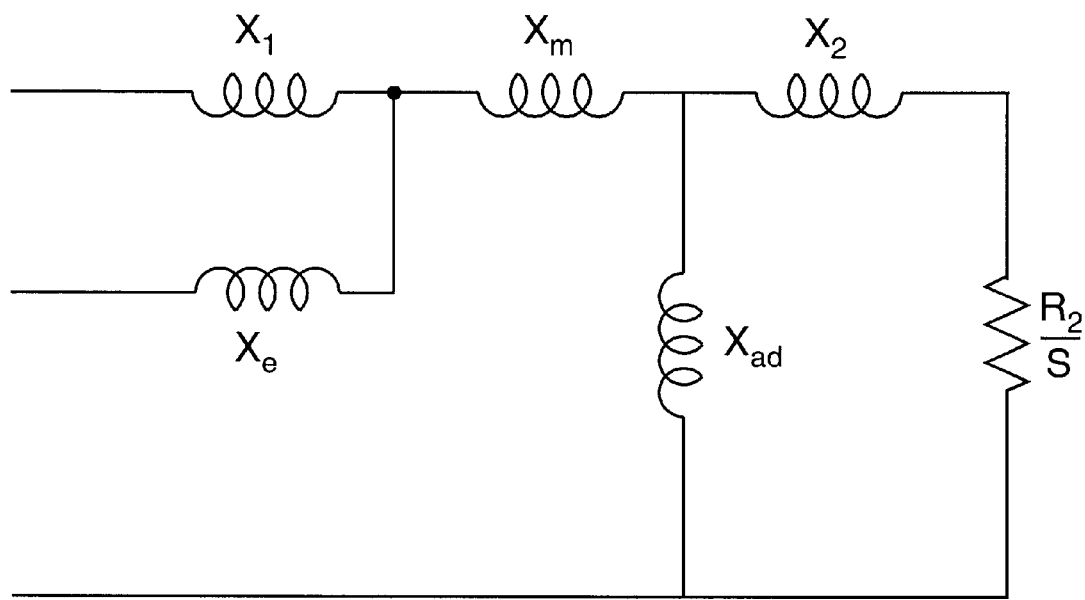
FIG. 5 is a equivalent circuit of the generator.
Figure 6:
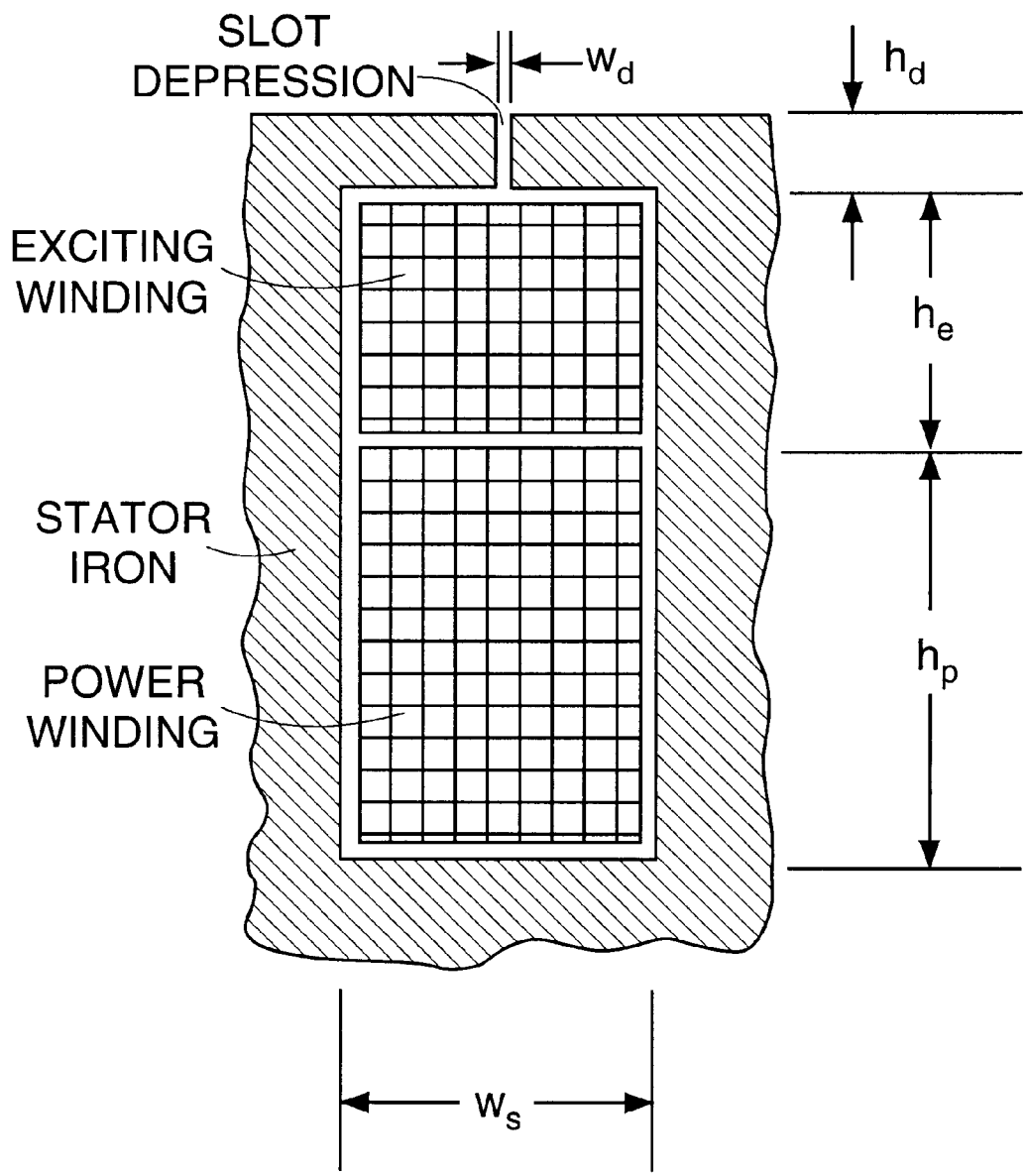
FIG. 6 shows an example of slot geometry for the two-winding stator assembly of the invention.

If the excitation winding is placed at the top of the stator slot, as shown in FIG. 5, we calculate the following slot permeances:

Excitation Winding:

$$p_e = \mu_o \left( \frac{h_d}{w_d} + \frac{1}{3} \frac{h_e}{w_s} \right) l$$

Power Winding:

$$p_p = \mu_o \left( \frac{h_d}{w_d} + \frac{h_e}{w_s} + \frac{1}{3} \frac{h_p}{w_s} \right) l$$

Mutual Permeance:

$$p_m = \mu_o \left( \frac{h_d}{w_d} + \frac{1}{2} \frac{h_e}{w_s} \right)$$

In these equations, $h_d$ is the height of the space between the top of the exciting winding and the top of the entire stator slot, $w_d$ is the slot depression, $h_o$ is the height of the excitation winding, $w_s$ is the width of the stator windings, $l$ is the machine active length, $h_p$ is the height of the power winding, and $\mu_o$ is the permeability of free space.

Now given that we have permeances that describe self- and mutual-inductances of the conductors in slots, it is possible to compute slot leakage inductances for the two windings, and these inductances will have both self-and mutual-components. The other components of stator leakage inductance, belt, zigzag, etc., will be essentially the same for both windings and will therefore have only mutual components. The stator leakage reactances are computed in the normal way, but have self and mutual components, as shown in the equivalent circuit of FIG. 5.

Figure 7:
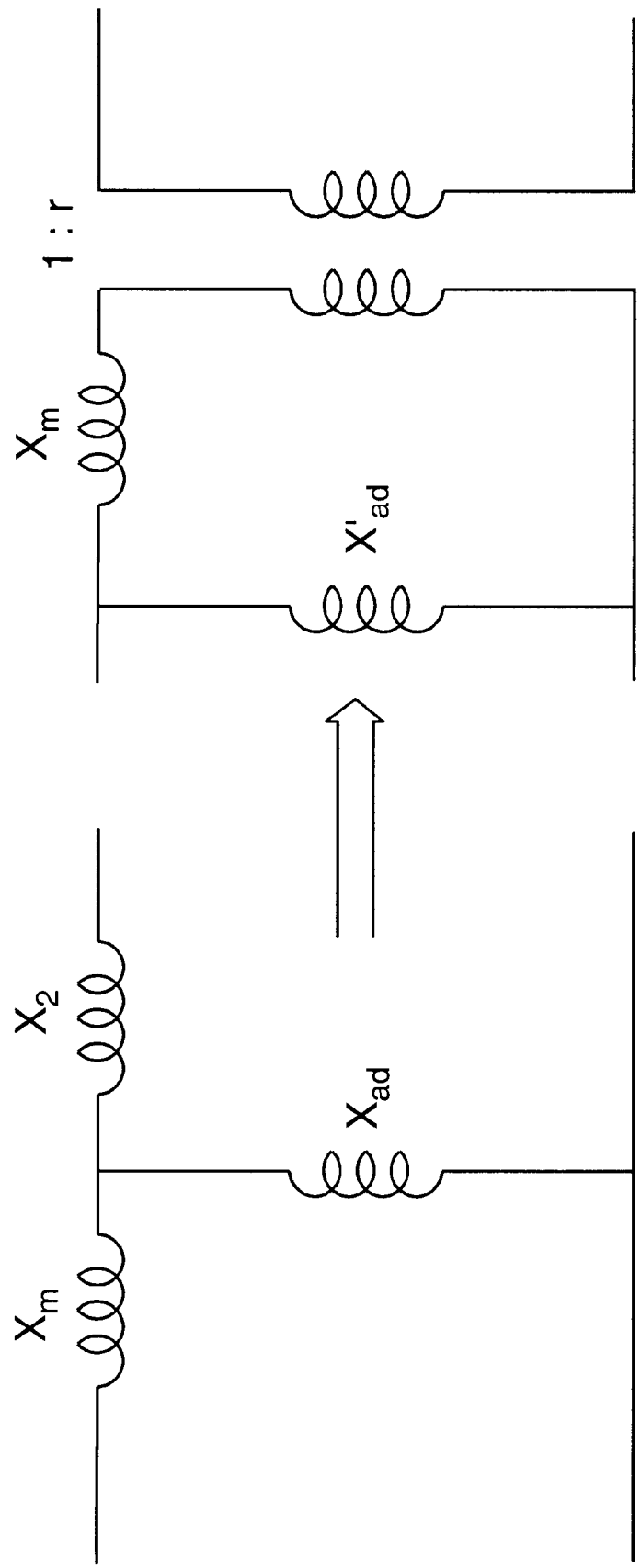
FIG. 7 is an illustration of a transformation of impedances associated with FIG. 6.

This circuit can be reduced in complexity by the simple transformation described in FIG. 7.

Essentially, what is done in this transformation is this: the array of three inductances is completely equivalent to two inductances and an 'ideal transformer', with the following relationships:

$$x'_{ad} = x_{ad} + x_m$$

$$r = \frac{x_{ad}}{x_{ad} + x_m}$$

$$x'_2 = \frac{1}{r^2}(x_2 + x_{ad}) - x'_{ad}$$

Figure 8:
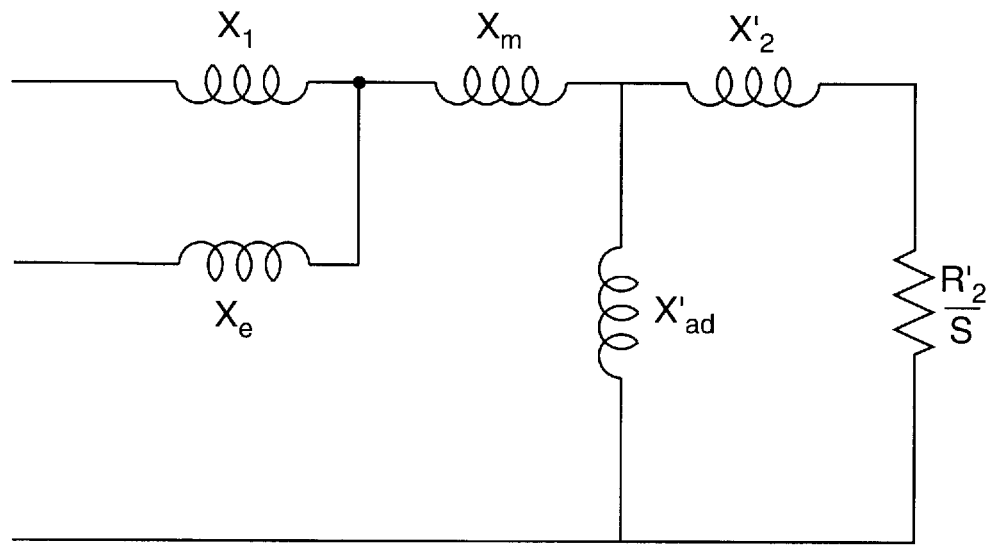
FIG. 8 shows a modified equivalent circuit.

This turns the equivalent circuit of FIG. 5 into that of FIG. 8, somewhat simplified. Note that the parameters of FIG. 8 are adjusted to account for the referral across the ideal transformer.

Figure 9:
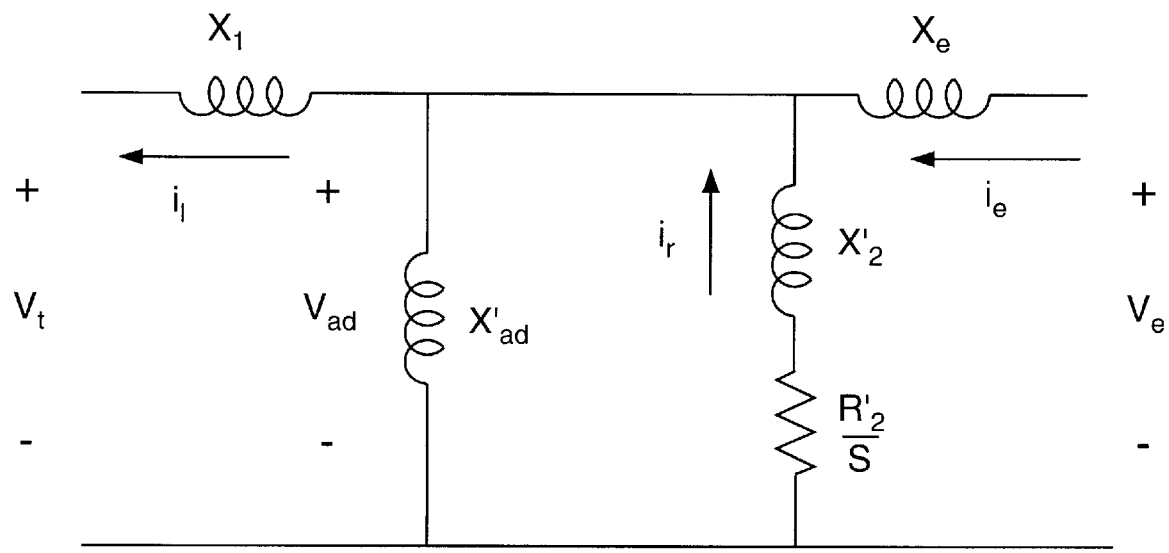
FIG. 9 is FIG. 8 redrawn to illustrate how the generator works.

Finally, this can be re-drawn as shown in FIG. 9, and while this is no different, it leads to some insight as to how the machine operates.

Figure 11:
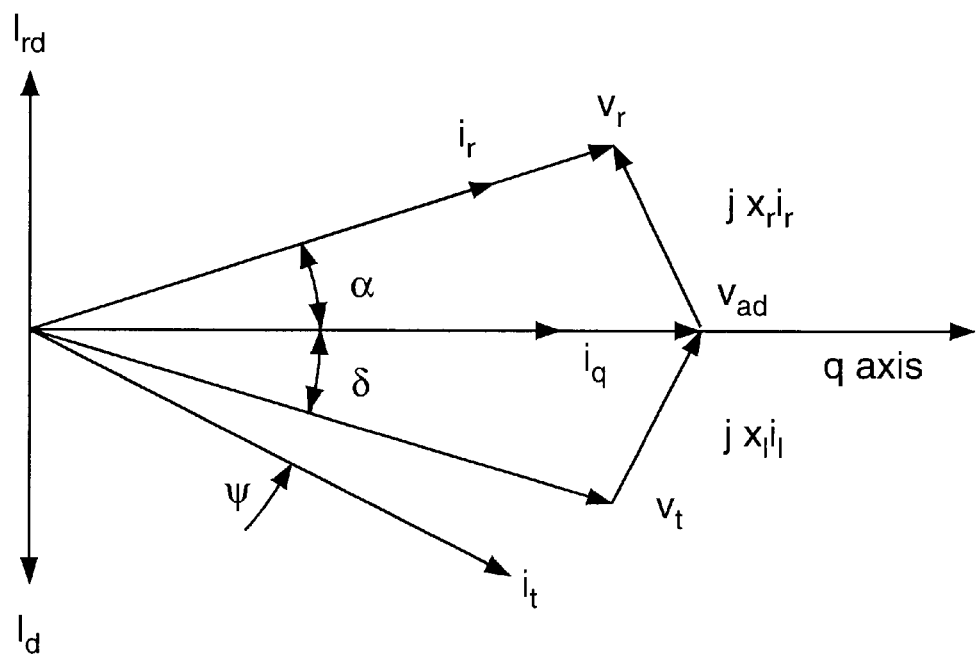
FIG. 11 shows a vector diagram of machine operation.

Operation of this machine is illustrated by the vector diagram shown in FIG. 11.

In the ensuing discussion, the q-axis is associated with purely real power while the d-axis is associated purely with reactive power. If there is no real power transfer through the excitation terminals, the q-axis components of terminal current and of rotor current (the two components which do carry real power) must be the same. (If the excitation winding injects no real power, its current must be purely on the d-axis). Note here we have put machine internal voltage $v_{ad}$ on the quadrature axis.

$$i_q = i_{rq} = i_{lq}$$

Similarly, d-axis currents must add up:

$$i_{ld} + \frac{v_{ad}}{x_{ad}} = i_{rd} + i_e$$

If we start assuming terminal voltage $v_t$, load current $i_1$ and power factor cos $\psi$, the expression for internal voltage is:

$$V^2_{ad} = (V_t + X_1 i_1 \sin\psi + r_1 i_1 \cos\psi)^2 + (X_1 i_1 \cos\psi - r_1 i_1 \sin\psi)^2$$

Next, we define the voltage across the rotor resistance (which is negative for a generator) as $v_r$, a complex quantity. Air-gap voltage can also be written as:

$$V_{ad} = V_r + jx_r i_r$$

Figure 12:
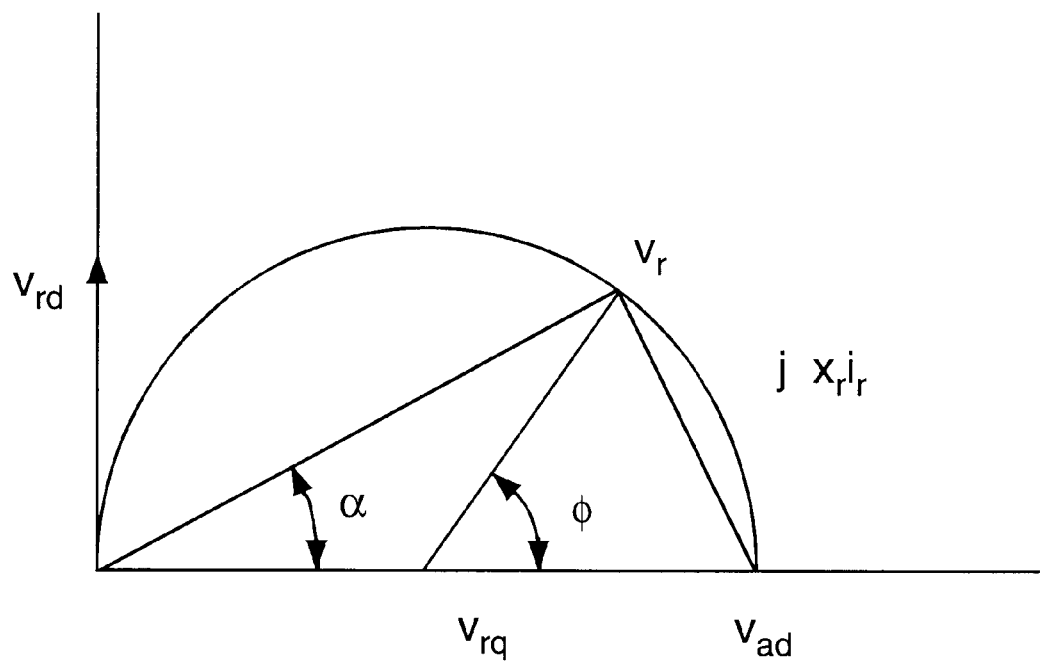
FIG. 12 shows a construction of the rotor voltage.
Figure 13:
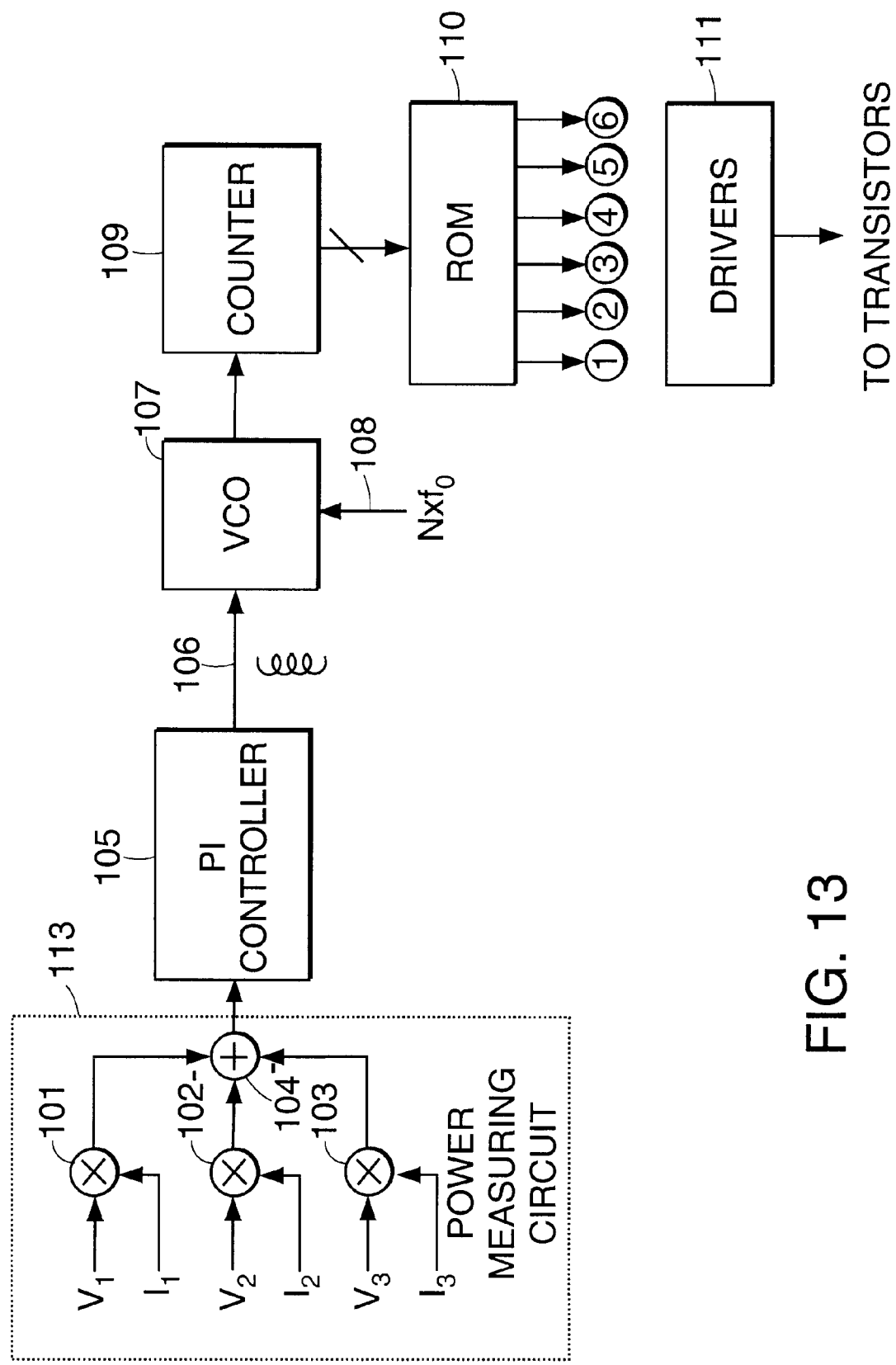
FIG. 13 shows a circuit for determining the phase timing of the three injected currents according to a preferred embodiment.

To construct $v_r$, note that it is aligned with $i_r$ and orthogonal to $jx_r i_r$. This is fairly easy to find if we note that the phasor representing $v_r$ must reside on a circle with radius $v_{ad}$ as shown in FIG. 12.

Note that $v_{rd} = -x_r i_{rq} = -x_r i_q$ (since the d-axis is directed downward in our plan view), then vrd, which is the projection of rotor resistance voltage $v_r$ onto the d-axis, is:

$$-v_{rd} = \frac{v_{ad}}{2} \sin\varphi$$

$$v_{rq} = \frac{1}{2} v_{ad}(1 + \cos\varphi)$$

which makes the magnitude of rotor voltage:

$$|v_r| = v_{ad} \sqrt{\frac{1 + \cos\varphi}{2}}$$

and of the angle of $v_r$, with respect to the q-axis ($V_{ad}$) is:

$$\cos\alpha = \frac{|v_r|}{v_{ad}} = \sqrt{\frac{1 + \cos\varphi}{2}}$$

Now we can compute $i_{rd}$, the required current in the direct (excitation) axis of the rotor:

$$i_{rd} = -i_q \tan\alpha$$

and the required exciting current is:

$$i_e = i_{ld} + \frac{v_{ad}}{x_{ad}} - i_{rd}$$

Finally, since exciting current is on the d-axis, required excitation voltage is simply:

$$V_e = V_{ad} + X_e i_e$$

The foregoing describes the manner for determining the operating point for the induction generator. Note that we have computed both $v_r$ and $i_r$. The ratio between these two is the required value of effective rotor resistance:

$$\frac{R_2}{s} = \frac{|v_r|}{i_r}$$

and this allows us to find the nominal slip at the operating point. The other elements of the operating point are estimated in already established ways.

As an alternative to the current source inverter shown in FIGS. 1–3, a pulse-width modulation (PWM) inverter could also be used.

Figure 15:
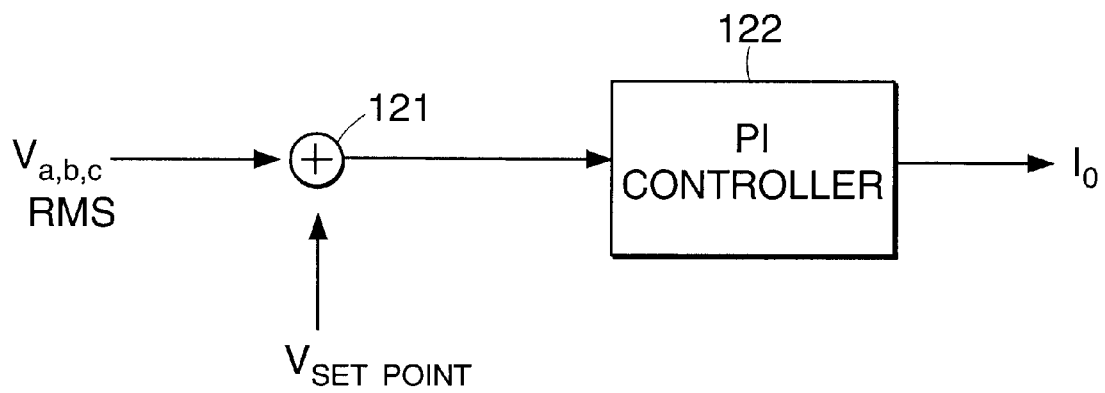
FIG. 15 shows a circuit for obtaining the amplitude of the injected currents according to a preferred embodiment.

In order to set the magnitude $I_0$ of the injected currents $i_1$–$i_3$ so that a desired voltage is obtained at the load terminals, the circuit of FIG. 15 can be used. The root-mean-square (RMS) value of the actual voltage appearing at the load terminals is presented to one input of adder 121 while the desired value of this voltage ($V_{set\ point}$) is presented at another input. The output of the adder is sent to PI controller circuit 122 which outputs the current magnitude $I_0$. If the magnitude of the three injected currents is set to this value, $I_0$, then the induction generator will generate a voltage substantially equal to $V_{set\ point}$ for supply to load 4.

The circuits described above are best implemented in a completely digital manner to obtain the fastest and most cost-effective realization of the advantages discussed herein.

One important advantage of using a separate stator winding for excitation is that a smaller voltage can be used for such excitation, as opposed to the higher voltage that may be desired to be supplied to the load from the main stator winding. For example, if a utilization voltage of 4 kV is desired to be supplied to the load, a much smaller 1 kV voltage can be supplied to the excitation windings.

Further, since voltage is proportional to flux, and flux is proportional to the current injected, better voltage control can be attained by simply varying the magnitude of the injected current.

Better frequency control is also attained. As long as current is injected in the same phasor direction as the flux, the generator will operate at practically any frequency. Thus, the frequency of rotation of the prime mover can be increased, thus increasing the electrical frequency generated, and corresponding changes in the current injected can be calculated accordingly.

Still further, since the two stator windings are separated, excitation of each can be handled by a different set of devices. For example, if the generator is to be operated into a DC bus, the invention allows the use of simple uncontrolled diode rectifiers to handle the real power output, while a smaller inverter, giving good control, can be used for the excitation system. Thus, it is not necessary to control the whole output power of the machine through the main stator control mechanism.

A design specification for a 20 kilowatt, 80 000 RPM squirrel cage induction generator is presented as Appendix A to this specification. Its basic parameters are:

| | |
|---|---|
| Rotor diameter: | 2 inches (5.08 cm) |
| Rotor length: | 2 inches (5.08 cm) |
| Number of Poles: | 2 |
| Number of Stator Slots: | 12 |
| Number of Rotor Slots: | 19 |
| Armature Turns: Power Winding | 40 |
| Armature Turns: Excit. Winding | 40 |
| Stator Conductor Diam.: | 0.02 inches |
| Conductors "in hand": power winding | 6 |
| Conductors "in hand": excit. winding | 2 |
| Stator Voltage (Line-Neutral): | 400 Volts |
| Power Winding Current | 17 amperes |
| Exciting Winding Current | 4.3 amperes |

This induction generator has an unusually favorable power/weight ratio of 5399 Watts/kg or 3.28 horsepower per pound.

Various changes and modifications are possible, within the scope of the inventive concept. For example, features of one embodiment may be combined with features of another embodiment.

APPENDIX A

CALCULATED PERFORMANCE OF A PREFERRED EMBODIMENT
Squirrel Cage Induction Generator, First Order, 80 000 RPM

| INPUT SHEET: | ABBREV. | METRIC (SI) | ENGL. UNITS |
|---|---|---|---|
| Required power | $P_{req}$ | 20 000 W | 26.81 HP |
| Rotational speed | RPM | 80 000 | |
| Voltage (L-N, RMS) | volts | 400 | |
| Pole pairs | pp | 1 | |
| Output Power Factor | pfa | 1.0000 | |
| Length | len | 0.0508 m | 2 in. |
| Air gap | gap | 0.0003 m | 0.01 in. |
| ROTOR: | | | |
| Rotor radius | rr | 0.0254 | 1 |
| Rough slot fraction | lamsr | 40.0% | |
| Fract. trap height | hrslot | 10.0% | |
| Number rotor slots | nr | 19 | |
| STATOR: | | | |
| Fract. slot height | hsr | 0.35 | |
| Rough tooth fraction | lamst | 0.55 | |
| Stator turns | na | 40 | |
| Number in hand (load) | npar | 6 | |
| Exciter winding | npare | 2 | |
| Fract. Core Depth | bcr | 0.55 | |
| Stator core diameter | dsc | 0.000508 m. | 0.02 in. |
| Slots per phase belt | m | 2 | |
| Overlap Slots | os | 1 | |
| MATERIAL PROPERTIES: | | | |
| Core loss parameters | e b | 2.1 | |
| Base Flux density | bbase | 1 | |
| | dbase | 100 | |
| | bzero | 1.2 | |
| FIRST ORDER RESULTS | | | 20 kW |
| Efficiency | | 96.9% | |
| Per-Unit Excitation | | 26.2% | |
| Weight | | 3.70 kg | 8.17 lbs |
| Power/weight | | 5399 W/kg | 3.28 HP/lb |
| Load Armature J (density) | | 5.7E + 06 amps/sq. meter | |
| Exciting Armature J | | 4.4E + 06 amps/sq. meter | |
| Air-Gap Flux Density | br | 0.51 Tesla | |
| Tooth Flux Density | bt | 0.97 Tesla | |
| Rotor Tooth Flux Density | | 0.91 Tesla | |
| Core Flux Density | bc | 0.93 Tesla | |
| Stator Space Factor | lama | 41.25% | |
| Tip Speed | | 213 m/sec | 698 ft/min |
| LOSS DETAILS: | | | |
| Core loss | | 160 Watts | |
| Load Stator Loss | | 235 Watts | |
| Slip Loss | | 105 Watts | |
| Gap Loss | | 91 Watts | |
| Excitation Stator Loss | | 47 Watts | |
| ELECTRICAL OPERATION: | | | |
| Electrical frequency | om | 8378 rad/sec | 1333 Hertz |
| Stator current | lt | 17 amps | |
| Power Factor Angle | psi | 0 deg (el.) | |
| Air-Gap Voltage | $V_{AG}$ | 405 volts | |
| Power Angle | deltt | 0.0158 radians | |
| Q-Axis current | l q | 16.66 amps | |
| D-Axis current | l dl | 0.26 amps | |
| Internal angle | phi | 0.1438 radians | |
| | e f | 1.3 | |
| | fzero | 10 000 | |
| Stator temp (deg. C.) | stemp | 220° C. | |
| Rotor temp (deg. C.) | rtemp | 316° C. | |
| Cu. resistivity @ 20 C | rhocu20 | 1.72E − 08 ohm-meters | |
| density of air | rhoair | 1.1774 | |
| kinematic viscosity | nuair | 1.56E − 05 | |
| viscosity | murair | 1.98E − 03 | |
| heat capacity | cpair | 1005.7 | |

APPENDIX A-continued

CALCULATED PERFORMANCE OF A PREFERRED EMBODIMENT
Squirrel Cage Induction Generator, First Order, 80 000 RPM

| INPUT SHEET: | ABBREV. | METRIC (SI) | ENGL. UNITS |
|---|---|---|---|
| iron density | rhoi | 8120 kg/cubic meter | |
| copper density | rhoc | 8400 kg/cubic meter | |
|  | muzero | 1.26E − 06 | |
| ROTOR CALCULATED DETAILS: | | | |
| rotor slot height | hr1 | 0.0055 m. | 0.216 in. |
| rotor slot top diam. | dtr | 0.0034 m. | 0.132 in. |
| rotor slot bottom diam. | dbr | 0.0025 m. | 0.099 in. |
| rotor slot Depr. H. | wr 2 | 0.0005 m. | 0.02 in. |
| rotor slot tooth | wrt | 0.0043 m. | 0.17 in. |
| End Ring Length | lre | 0.0191 m. | 0.75 in. |
| Top Circ. Mid. | tcrn | 0.0232 | 0.914 |
| Rotor Slot Trap Ht | htr | 0.0025 | 0.01 |
| Rotor Slot Inner Rad. | rsri | 0.0194 | 0.764 |
| Bot. Circ. Mid. | bcm | 0.0207 | 0.814 |
| ROTOR ELECTRICAL CALC.: | | | |
| Rotor Slot Area | ars | 2.304E − 05 $m^2$ | |
| Rotor Conductivity | sigr | 2.68E + 07 mho/m. | |
| Rotor Slot Resistance | rrb | 0.0016 ohms | |
| End Correction | cre | 0.67 | |
| STATOR CALCULATED DETAILS: | | | |
| Rotor Voltages | V_rd | −29.01 volts | |
|  | V_rq | 402.63 volts | |
| Other internal | alf | 0.0722 | |
| D-Axis Rotor | l_dr | −1.205 | |
| D-Axis Air Gap | l_dag | 2.846 | |
| Exciting Current | I_e | 4.314 amps | |
| Exciting Voltage | V_e | 404.541 volts | |
| Exciting Reactive | Q_e | 5235 VAR | 26.2% |
| Stator Loss | P_s | 235 Watts | |
| Air-Gap Power | P_ag | 20235 Watts | |
| Indicated Slip | Si | 0.0052 | |
| Slip Power | P_si | 105 Watts | |
| Mech. Power | P_m | 20591 Watts | |
| Exciter Power | P_e | 47 Watts | |
| Efficiency | eta | 96.9% | |
| MECHANICAL OPERATION: | | | |
| Mechanical speed | omm | 8378 radians/sec | |
| Gap Reynold's No. | rennum | 3465 | |
| Shear Dissipation | pgaps | 91 Watts | |
| REACTANCE DETAILS: | | | |
| Belt | xb | 0.0443 ohms | |
| Stator Zigzag | xz | 2.3164 ohms | |
| Stator Slot Power self | xsp | 0.9495 ohms | |
| Excit. self | xep | 0.5341 ohms | |
| Mutual | xsm | 0.5766 ohms | |
| Rotor Zigzag | xrz | 0.7943 ohms | |
| Rotor Slot | xrs | 0.8765 ohms | |
| Slot Avg. Radius | srsa | 0.0309 m. | 1.215 in. |
| Slot Pitch | ssp | 0.0162 m. | 0.636 in. |
| Ratio: Slot/Pitch | spr | 0.4033 | |
| Stator Slots | ns | 12 | |
| Coil Throw | np | 5 | |
| power winding fraction | alfp | 75% | |
| Stator Slot Depth | h_1 | 0.0089 m. | 0.35 in. |
| Stator Depr. Depth | h_2 | 0.0008 m. | 0.03 in. |
| Stator Slot Width | w_1 | 0.0065 m. | 0.257 in. |
| Stator Dept. Width | w_2 | 0.0013 m. | 0.440 in. |
| Width of Stator Teeth | wt | 0.0073 m. | 0.288 in. |
| Stator Slot Area | aslot | 0.0000786 $m^2$ | |
| Core Depth | d_c | 0.0140 m. | 0.55 in. |
| Stator Conductivity | siga | 3.25E + 07 mho/meter | |
| Turns/coil | tpc | 10 | |
| WEIGHT CALCULATION: | | | |
| Tooth Mass: Stator | mtooth | 0.74 kg | 1.627 lb. |
| Tooth Mass: Rotor | mtr | 0.17 kg | 0.369 lb. |
| Back Iron | mback | 1.53 kg | 3.376 lb. |
| Inner Iron | minn | 0.45 kg | 0.992 lb. |
| Cage Weight | mcage | 0.46 kg | 1.007 lb. |
| Stator Winding | msw | 0.36 kg | 0.798 lb. |
| Winding Weight | Mw | 0.82 kg | 1.804 lb. |
| Rotor Iron Weight | Ms | 0.62 kg | 1.361 lb. |
| Core Weight | Mc | 2.27 kg | 5.003 lb. |
| Total Weight | Wtot | 3.70 kg | 8.169 lb. |
| CORE DISSIPATION: | | | |
| Tooth Diss. Density | dt | 74.60 watts/kg | |
| Core Diss. Density | dc | 68.70 watts/kg | |
| Core Loss | pcore | 160 watts/kg | |
| Azimuthal Coil Throw | cta | 0.0808 m. | 3.181 in. |
| End Length | l_1 | 0.0178 m. | 0.701 in. |
| End Res. Length | l_2 | 0.0883 m. | 3.476 in. |
| SUMMARY OF PARAMETERS: | | | |
| Stator Resistance (Exciting) | r_1 | 0.28182 ohms | |
|  | r_1e | 0.84547 ohms | |
| Rotor Resistance | r_2 | 0.12073 ohms | |
| Magnetizing X | xad | 142.18980 ohms | |
| Rotor Reactance | x_2 | 1.67080 ohms | |
| Power Side Leakage | x_p | 0.28283 ohms | |
| Excit. Side Leakage | x_e | −0.04254 ohms | |
| Mutual Leakage | x_m | 2.93732 ohms | |
| Turns Ratio | rt | 0.097976 | |
| Referred magnetizing | x_adr | 145.12712 ohms | |
| Referred Rotor X | x_2r | 1.74054 ohms | |
| Referred Rotor R | r_2r | 0.12577 ohms | |
| WINDING FACTORS: | | | |
| Stator Slot Angle | gama | 0.5236 | |
| breadth factor | kb_1 | 0.9659 | |
|  | kb_5 | 0.2588 | |
|  | kb_7 | −0.2588 | |
| pitch factor | kp_1 | 0.9659 | |
|  | kp_2 | 0.2588 | |
|  | kp_2 | 0.2588 | |
|  | k_1 | 0.9330 | |
|  | k_5 | 0.0670 | |
|  | k_7 | −0.0670 | |

What is claimed is:

1. An induction generator comprising:

a multi-phase stator power winding connected to a load;

a multi-phase separate stator excitation winding;

power calculation means (113) for continuously monitoring values of real power applied by each phase of said excitation winding to said power winding;

a current injector (140), connected to an output of said power calculation means (113), outputting respective excitation currents to said phases of separate stator winding, at times selected to minimize values of real power applied to said power winding; and a rotor connected to a prime mover.

2. The induction generator of claim 1, wherein
said separate stator winding is connected to an output of a current source inverter (140).

3. The induction generator of claim 1, wherein
said power calculation means (113) receives voltage and current as inputs from said separate stator winding and creates a timing signal (109) therefrom.

4. The induction generator of claim 3, wherein said timing signal (109) is supplied to said current injector.

5. The induction generator of claim 3, wherein
said timing signal is created using a voltage controlled oscillator (110).

6. A method of operating an induction generator having a multi-phase power winding and a multi-phase excitation winding, comprising steps of:
 (a) measuring power created in each phase of said excitation winding;
 (b) generating a power error signal from said measured power;
 (c) developing control signals based on said power error signal;
 (d) generating respective excitation phase currents in accordance with said control signals; and
 (e) injecting said currents into said excitation winding phases at times selected to minimize transfer of real power from said excitation winding phases to said power winding phases.

7. The method of claim 6, comprising injecting a sinusoidal excitation current which is 90 degrees out of phase with a sinusoidal voltage wave in said excitation winding.

8. The method of claim 6, wherein said excitation phase currents are generated using an inverter.

9. The method of claim 6 wherein said stator winding is a three-phase winding, and said step (a) includes sub-steps of:
 (b1) multiplying, for each phase, current existing in that phase winding and voltage developed across that phase winding; and
 (b2) adding the results of sub-step (b1) by applying said results to an algebraic adder.

* * * * *